(12) United States Patent
Kamikawa et al.

(10) Patent No.: US 8,052,332 B2
(45) Date of Patent: Nov. 8, 2011

(54) WHEEL BEARING ASSEMBLY, AND MANUFACTURING METHOD THEREOF

(75) Inventors: Tsuyoshi Kamikawa, Nara (JP); Masanobu Yamaguchi, Nagoya (JP); Satoru Murao, Sakai (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 411 days.

(21) Appl. No.: 12/385,085

(22) Filed: Mar. 30, 2009

(65) Prior Publication Data
US 2009/0252551 A1 Oct. 8, 2009

(30) Foreign Application Priority Data

Mar. 28, 2008 (JP) .................................. 2008-086737
Mar. 28, 2008 (JP) .................................. 2008-087093

(51) Int. Cl.
*F16C 13/00* (2006.01)
(52) U.S. Cl. ........................................ 384/544; 464/178
(58) Field of Classification Search .................. 384/544, 384/589; 464/178, 906
See application file for complete search history.

(56) References Cited

U.S. PATENT DOCUMENTS

| 3,586,357 | A | * | 6/1971 | Orain ............................. 403/380 |
| 4,460,058 | A | | 7/1984 | Welschof et al. |
| 4,893,960 | A | | 1/1990 | Beier et al. |
| 5,549,514 | A | | 8/1996 | Welschof |
| 6,146,022 | A | | 11/2000 | Sahashi et al. |
| 7,670,059 | B2 | * | 3/2010 | Gradu et al. .................. 384/589 |
| 2003/0064817 | A1 | | 4/2003 | Hacker et al. |

FOREIGN PATENT DOCUMENTS

| DE | 42 30 639 C 1 | 10/1993 |
| DE | 10 2007 016 427 A1 | 10/2008 |
| JP | 57-178903 A | 11/1982 |
| JP | 62-194903 A | 8/1987 |
| WO | WO 2006/092119 A1 | 9/2006 |
| WO | WO 2006/092121 A1 | 9/2006 |
| WO | WO 2006/105748 A1 | 10/2006 |
| WO | WO 2006/111140 A1 | 10/2006 |
| WO | WO 2006/111146 A2 | 10/2006 |
| WO | WO 2006/114083 A1 | 11/2006 |
| WO | WO 2007/014553 A1 | 2/2007 |
| WO | WO 2007/140762 A2 | 12/2007 |
| WO | WO 2008/003292 A1 | 1/2008 |
| WO | WO 2008/006339 A1 | 1/2008 |

OTHER PUBLICATIONS

Extended European Search Report dated Jul. 27, 2009.

* cited by examiner

*Primary Examiner* — Thomas R Hannon
(74) *Attorney, Agent, or Firm* — McGinn IP Law Group, PLLC (57) ABSTRACT

In a wheel bearing assembly, an outer surface of a head portion of a link bolt contacts an inner surface of an end wall portion of a constant-velocity joint outer ring. A shaft portion of a link bolt is press-fit into a penetration hole of the constant-velocity joint outer ring. An external threaded portion of the link bolt is inserted into the central hole of a hub spindle so that the external threaded portion protrudes from an outer end surface of a hub wheel. A lock nut is fastened to the external threaded portion, so that the wheel hub and the constant-velocity joint outer ring are linked, and the first spline and the second spline are meshed so as to be capable of torque transmission.

16 Claims, 8 Drawing Sheets

WHEEL BEARING ASSEMBLY, AND MANUFACTURING METHOD THEREOF

INCORPORATION BY REFERENCE

The disclosure of Japanese Patent Application No. 2008-086737 filed on Mar. 28, 2008 and of Japanese Patent Application No. 2008-087093 filed on Mar. 28, 2008 including the specification, drawings and abstract is incorporated herein by reference in its entirety.

BACKGROUND OF THE INVENTION

1. Field of the Invention

This invention relates to a wheel bearing assembly in which a hub spindle of a wheel hub to which a traveling wheel is attached, and a constant-velocity joint outer ring are interlinked so as to be capable of torque transmission, and to a method of manufacturing the bearing assembly.

2. Description of the Related Art

Figure 9:
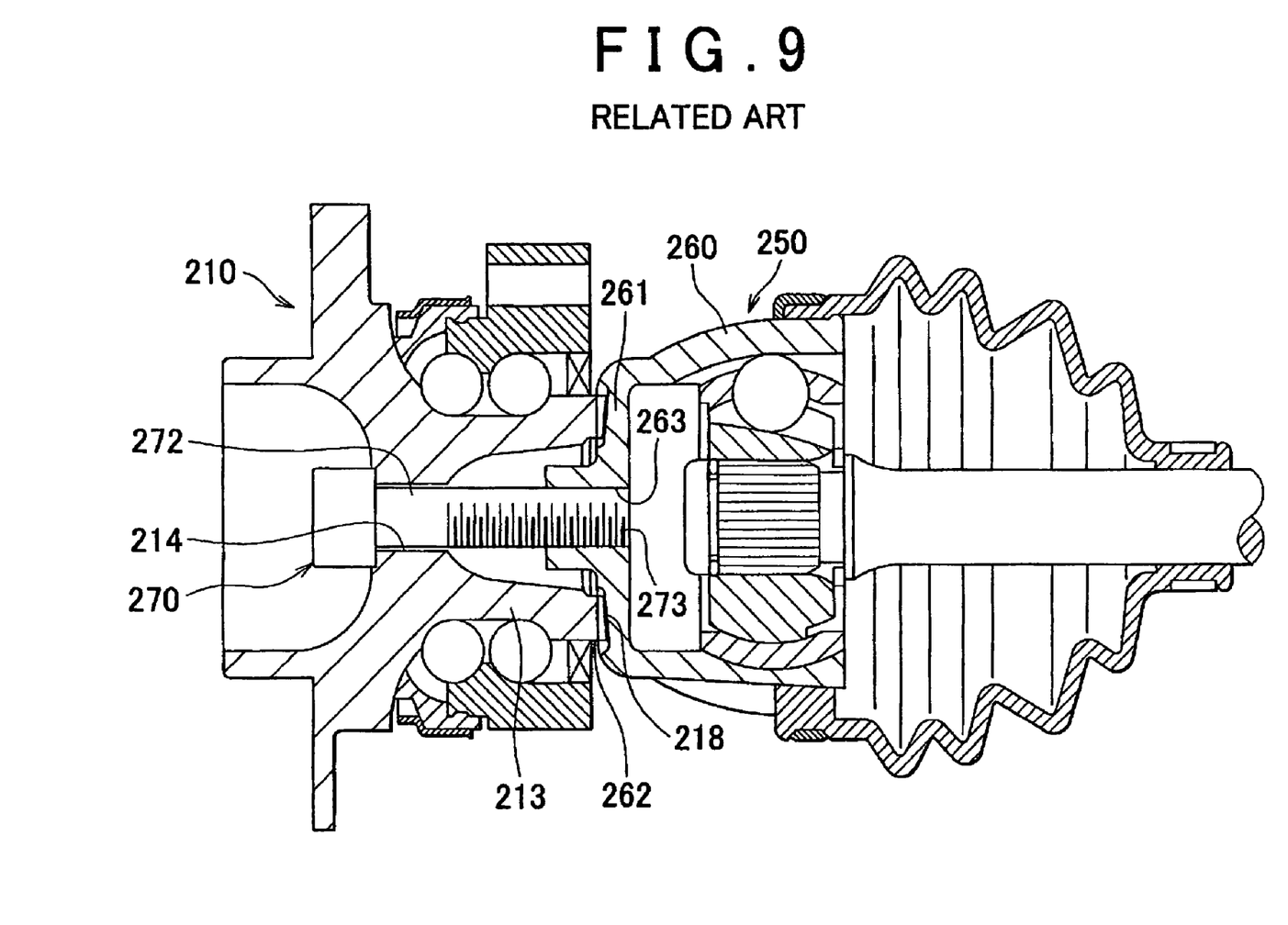
FIG. 9 is a longitudinal sectional view showing a related-art wheel bearing assembly.

In this type of wheel bearing assembly, a device having a structure disclosed, for example, in Japanese Patent Application Publication No. 57-178903 (JP-A-57-178903) as related art 1, and Japanese Patent Application Publication No. 62-194903 (JP-A-62-194903) as related art 2. In such a device, as shown in FIG. 9, in order to connect a wheel hub 210 and a constant-velocity joint 250 so that torque can be transmitted, two splines 218 and 262, two splines 218 and 262 that mesh with each other to transmit torque between a wheel hub 210 and a constant-velocity joint outer ring 260 are formed on an inner end surface of a hub spindle 213 of the wheel hub 210, and an outer end surface of an end wall portion 261 of the constant-velocity joint outer ring 260. Besides, in order to link the hub spindle 213 of the wheel hub 210 and the constant-velocity joint outer ring 260 with each other, an internal thread 263 corresponding to an external threaded portion 273 of a link bolt 270 is formed in the end wall portion 261 of the constant-velocity joint outer ring 260, and a central hole 214 through which a shaft portion 272 of the link bolt 270 is inserted is formed in a central portion of the hub spindle 213. Then, with the two splines 218 and 262 meshed with other, the shaft portion 272 of the link bolt 270 is inserted through the central hole 214 from a vehicle outer side of the hub spindle 213, and the external threaded portion 273 of the shaft portion 272 is fastened to the internal thread 263 of the end wall portion 261 of the outer ring 260. Thus, the hub spindle 213 of the wheel hub 210 and the constant-velocity joint outer ring 260 are linked to each other.

Incidentally, as for the wheel bearing assembly having a structure as shown in FIG. 9, the operation of inserting the shaft portion 272 of the link bolt 270 through the central hole 214 from the vehicle outer side of the hub spindle 213, with the two splines 218 and 262 being in mesh, and of aligning a distal end of the external threaded portion 273 of the shaft portion 272 with the internal thread 263 of the end wall portion 261 of the outer ring 260 is troublesome, and a great amount of labor is needed in order to fasten the link bolt 270.

SUMMARY OF THE INVENTION

It is an object of this invention to provide a wheel bearing assembly in which a hub spindle of a wheel hub and a constant-velocity joint outer ring can easily be linked with each other by a link bolt while two splines of the hub spindle of the wheel hub and of the constant-velocity joint outer ring are meshed with each other, and a method of manufacturing the wheel bearing assembly.

A wheel bearing assembly in accordance with one aspect of the invention includes: a wheel hub having a hub spindle, and a central hole that penetrates the hub spindle; a rolling bearing provided on an outer periphery of the hub spindle of the wheel hub; a constant-velocity joint outer ring having an end wall portion, a penetration hole that penetrates the end wall portion, and a first spline provided on an outer end surface of the end wall portion; a link bolt that has a shaft portion, a head portion provided on an inner end of the shaft portion, and an external threaded portion provided on an outer end of the shaft portion, and that links the wheel hub and the constant-velocity joint outer ring; and a lock nut that is screwed to the external threaded portion of the link bolt. A second spline is provided on at least one of an inner end surface of the hub spindle and an inner end surface of the rolling bearing. An outer surface of the head portion of the link bolt contacts an inner surface of the end wall portion of the constant-velocity joint outer ring, and the shaft portion of the link bolt is press-fitted into the penetration hole of the constant-velocity joint outer ring. The external threaded portion of the link bolt is inserted through the central hole of the hub spindle, and the lock nut is fastened to the external threaded portion protruded from an outer end surface of the hub spindle. Thus, the wheel hub and the constant-velocity joint outer ring are linked with each other, and the first spline and the second spline are meshed with each other so as to be capable of torque transmission.

According to this construction, in the case where the wheel hub and the constant-velocity joint are integrally linked to each other so as to be capable of torque transmission, the shaft portion of the link bolt is press-fitted, beforehand, into the penetration hole of the end wall portion from the inner side of the end wall portion of the constant-velocity joint outer ring, up to such a position that the lower surface of the head portion contacts.

As a result of this, the shaft portion of the link bolt protrudes a predetermined length from the outer end surface of the end wall portion of the constant-velocity joint outer ring. Next, the shaft portion of the link bolt is inserted through the central hole of the hub spindle of the wheel hub from the vehicle inner side (the inner side in the vehicle width direction) toward the outer side (the outer side in the vehicle width direction). Then, the external threaded portion of the distal end portion of the shaft portion of the link bolt is caused to protrude from the central hole of the hub spindle to the outer side, while the spline provided on the inner end surface of the hub spindle and the spline provided on the outer end surface of the end wall portion of the constant-velocity joint outer ring are being brought into mesh. Herein, by fastening the external threaded portion of the shaft portion of the link bolt, the wheel hub and the constant-velocity joint can easily be linked.

Besides, the wheel bearing assembly in accordance with the foregoing aspect, the rolling bearing may include a rolling bearing inner ring, and a calked portion that is calked radially outward, and fixes the rolling bearing inner ring may be formed on the inner end of the hub spindle of the wheel hub, and the second spline may be formed on an inner end surface of the calked portion.

According to this construction, since the second spline is formed on the inner end surface of the calked portion that is provided on the hub spindle of the wheel hub, the outside diameter dimension of the second spline can be made larger. Then, since the first spline having an outside diameter dimension corresponding to that of the second spline of the hub spindle is formed on the outer end surface of the end wall portion of the constant-velocity joint outer ring, and is meshed with the second spline, the torque transmission characteristic can be improved.

Besides, the wheel bearing assembly in accordance with the foregoing aspect, the head portion of the link bolt may be non-circular, and a first recess portion that is fitted to the head portion of the link bolt so as to prevent the head portion from rotating may be formed on the inner surface of the end wall portion of the constant-velocity joint outer ring.

According to this construction, since the head portion of the link bolt is fit into the first recess portion of the end wall portion of the constant-velocity joint outer ring so as to be prevented from rotating, the link bolt does not accidentally rotate when the lock nut is fastened to the external threaded portion of the link bolt. Thus, the lock nut can easily be fastened.

Besides, the wheel bearing assembly in accordance with the foregoing aspect, a flat surface may be formed on an periphery of the head portion of the link bolt, and the first recess portion may have a shape that corresponds to a shape of the head portion, so that the link bolt is prevented from rotating.

Besides, in the wheel bearing assembly in accordance with the foregoing aspect, a circular jaw portion may be formed on a seat portion of the lock nut, and a second recess portion for center alignment that has an inside diameter dimension substantially equal to a diameter of the circular jaw portion of the lock nut may be formed on an outer end surface of the hub spindle of the wheel hub.

According to these constructions, by fitting the circular jaw portion (circular seat portion) of the lock nut into the center-aligning second recess portion provided on the outer end surface of the hub spindle, and fastening the lock nut to the external threaded portion of the link bolt, the wheel hub and the constant-velocity joint can be accurately aligned on the same center line.

Besides, the wheel bearing assembly in accordance with the foregoing aspect, the second spline may be provided on an inner end surface of the rolling bearing.

Besides, the wheel bearing assembly in accordance with the foregoing aspect, the rolling bearing may have a rolling bearing inner ring whose inner end surface is provided with the second spline, and which has been treated with heat.

According to this construction, since the rolling bearing inner ring is treated with heat, the strength of the second spline can be heightened.

Besides, the wheel bearing assembly in accordance with the foregoing aspect, the rolling bearing may be an angular contact rolling bearing, and the angular contact rolling bearing may include a rolling bearing outer ring, a rolling bearing inner ring, a first raceway surface provided on the rolling bearing outer ring, a second raceway surface that is provided on the rolling bearing inner ring and that is disposed apart in an axis direction of the hub spindle from the first raceway surface, and a rolling element that is provided between the first raceway surface and the second raceway surface and that contacts the first raceway surface and the second raceway surface, and a spline meshing area at which a third spline provided on an inner peripheral surface of the rolling bearing inner ring and a fourth spline provided on an outer peripheral surface of the hub spindle mesh with each other may be provided at a position that is apart from a straight line that connects a contact point between the rolling element and the first raceway surface, and a contact point between the rolling element and the second raceway surface.

According to this construction, the torque of the constant-velocity joint is transmitted to the rolling bearing inner ring by the mesh engagement between the first spline of the outer end surface of the constant-velocity joint outer ring and the second spline of the inner end surface of the rolling bearing inner ring of the angular contact rolling bearing. Then, the torque transmitted to the rolling bearing inner ring is transmitted to the hub spindle by the spline meshing area between the third spline provided on the inner peripheral surface of the rolling bearing inner ring and the fourth spline provided on the outer peripheral surface of the hub spindle of the wheel hub. Hence, torque can be transmitted from the constant-velocity joint to the hub spindle in a good manner. Then, the spline meshing area between the inner peripheral surface of the rolling bearing inner ring and the outer peripheral surface of the hub spindle of the wheel hub is formed at a position that is apart from the straight line that connects the contact point between the first raceway surface of the hub spindle and the rolling element and the contact point between the second raceway surface of the rolling bearing inner ring and the rolling element. Therefore, the load of the rolling element does not act on the spline meshing area during the rolling of the rolling element. Therefore, the movement of the rolling element of the angular contact rolling bearing becomes stable.

Besides, the wheel bearing assembly in accordance with the foregoing aspect, the spline meshing area may be disposed apart from the straight line to an inner side in the axis direction of the hub spindle.

Besides, the wheel bearing assembly in accordance with the foregoing aspect, the rolling bearing may have a rolling bearing inner ring, and a calked portion may be formed by calking an inner end of the hub spindle radially outward, and the rolling bearing inner ring may be fixed by the calked portion.

According to this construction, since the inner end of the hub spindle is fixed by calking to the rolling bearing inner ring, the loosening between the hub spindle and the rolling bearing inner ring in the axis direction is restrained, and the raceway surface of the rolling bearing inner ring becomes stable.

Besides, the wheel bearing assembly in accordance with the foregoing aspect, the rolling bearing may have a rolling bearing inner ring, and a flange portion that extends from an inner end of the rolling bearing inner ring in a radially outward direction, and the calked portion may be formed by calking the inner end surface of the hub spindle radially outward, at a site that is positioned radially inward in the flange portion, and the second spline may be formed at a site on the flange portion that is positioned radially outward from the calked portion of the hub spindle.

According to this construction, the site on the inner end surface of the rolling bearing inner ring at which the second spline is formed is not plastically deformed by caking or the like during the assembly of the wheel bearing assembly. Therefore, the strength of the tooth surface of the second spline can be heightened by treating the rolling bearing inner ring with heat before the assembly. Hence, the strength of the site where the second spline is formed is heightened, so that torque can be transmitted in a good manner, and advantage against the shear stress caused by the running torque can be achieved. Besides, the inner end of the rolling bearing inner ring is provided with the flange portion that extends radially outward. At a site radially outward from the calk-fixed position in the radial direction of the rolling bearing inner ring, the inner end surface of the rolling bearing inner ring and the outer end surface of the constant-velocity joint outer ring are engaged by the meshing of the splines. Therefore, the diameter of the second spline enlarges, so that the torque transmission capability improves, and advantage against shear stress can be achieved.

Besides, the wheel bearing assembly in accordance with the foregoing aspect, the rolling bearing may have a rolling bearing inner ring, and a flange portion that extends from an inner end of the rolling bearing inner ring in a radially outward direction, and the second spline is provided at a radially outward position on the flange portion.

In this construction, since the diameter of the second spline is enlarged, the torque transmission capability improve, and advantage against shear stress.

Besides, the wheel bearing assembly in accordance with the foregoing aspect, the rolling bearing may be a multi-row rolling bearing having a rolling bearing inner ring, and a first inner ring raceway surface may be formed on the rolling bearing inner ring, and a second inner ring raceway surface may be formed on an outer peripheral surface of the hub spindle.

Besides, the wheel bearing assembly in accordance with the foregoing aspect, the rolling bearing may have a rolling bearing outer ring, a rolling bearing inner ring, a rolling element positioned between the rolling bearing outer ring and the rolling bearing inner ring, and a cage that holds the rolling element, and the hub spindle may have a large-diameter shaft portion, and a small-diameter shaft portion that is smaller in diameter than the large-diameter shaft portion, and the rolling bearing inner ring may be fitted to the small-diameter shaft portion of the hub spindle.

Besides, a method of manufacturing a wheel bearing assembly in accordance with another aspect of the invention includes: preparing a wheel hub having a hub spindle, and a central hole that penetrates the hub spindle; preparing a rolling bearing disposed on an outer periphery of the hub spindle of the wheel hub; preparing a constant-velocity joint outer ring having an end wall portion, a penetration hole that penetrates the end wall portion, and a first spline provided on an outer end surface of the end wall portion; and preparing a link bolt that has a shaft portion, a head portion provided on an inner end of the shaft portion, and an external threaded portion provided on the outer end of the shaft portion, and that links the wheel hub and the constant-velocity joint outer ring; preparing a lock nut that is screwed to the external threaded portion of the link bolt; using the outer ring member or the rolling bearing that has a construction in which a second spline is provided on at least one of an inner end surface of the hub spindle and an inner end surface of the rolling bearing; press-fitting the shaft portion of the link bolt into the penetration hole of the constant-velocity joint outer ring; causing an outer surface of the head portion of the link bolt to contact an inner surface of the end wall portion of the constant-velocity joint outer ring; inserting the external threaded portion of the link bolt through the central hole of the hub spindle, and causing the external threaded portion to protrude from the outer end surface of the hub spindle; and linking the wheel hub and the constant-velocity joint outer ring by fastening the lock nut to the external threaded portion.

Besides, in the wheel bearing assembly manufacturing method in accordance with the second aspect of the invention, the second spline may be formed on the inner end surface of the rolling bearing inner ring of the rolling bearing, and the rolling bearing inner ring may be treated with heat.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
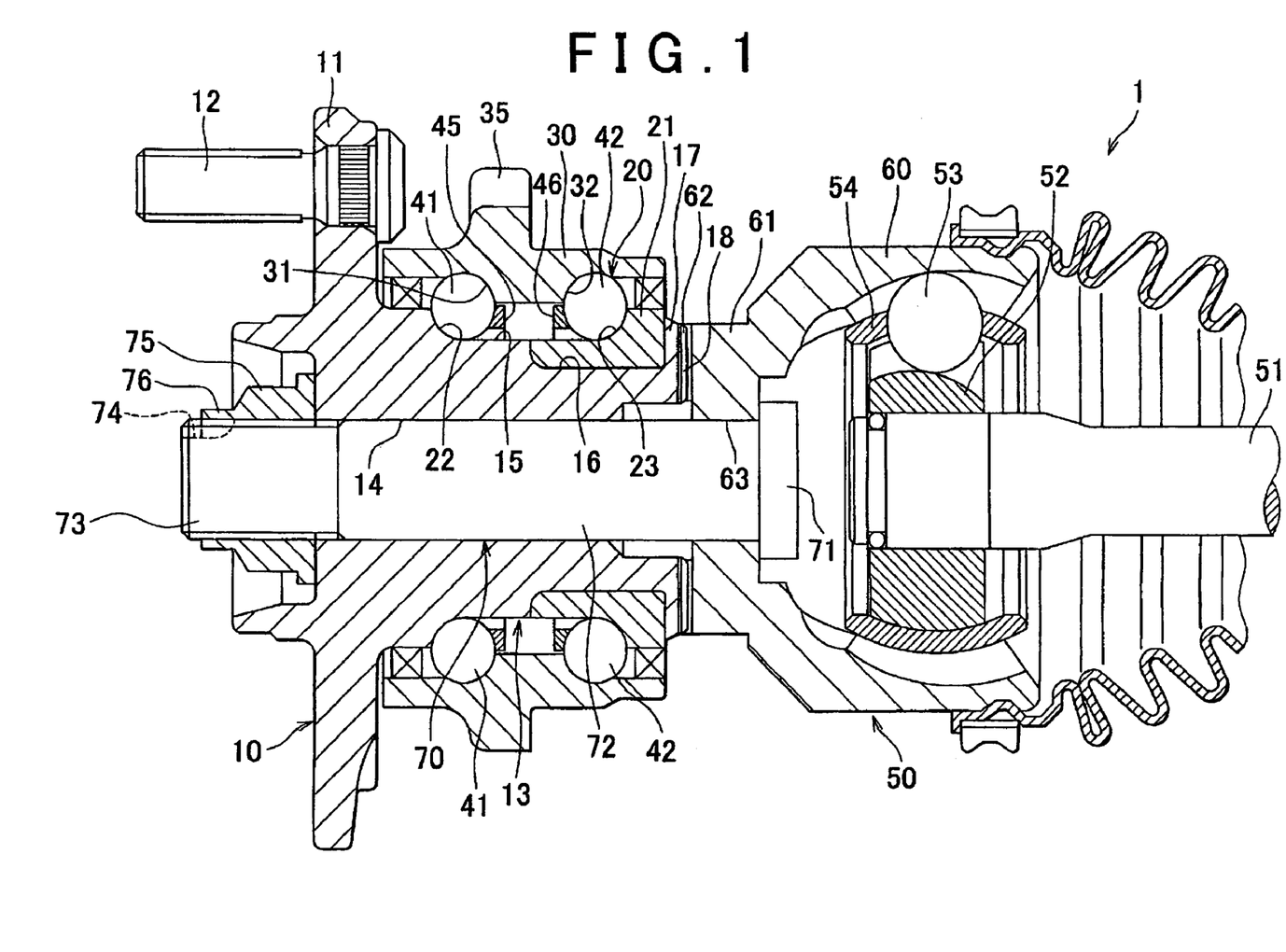
FIG. 1 is a longitudinal sectional view showing a wheel bearing assembly in accordance with a first embodiment of this invention.
Figure 2:
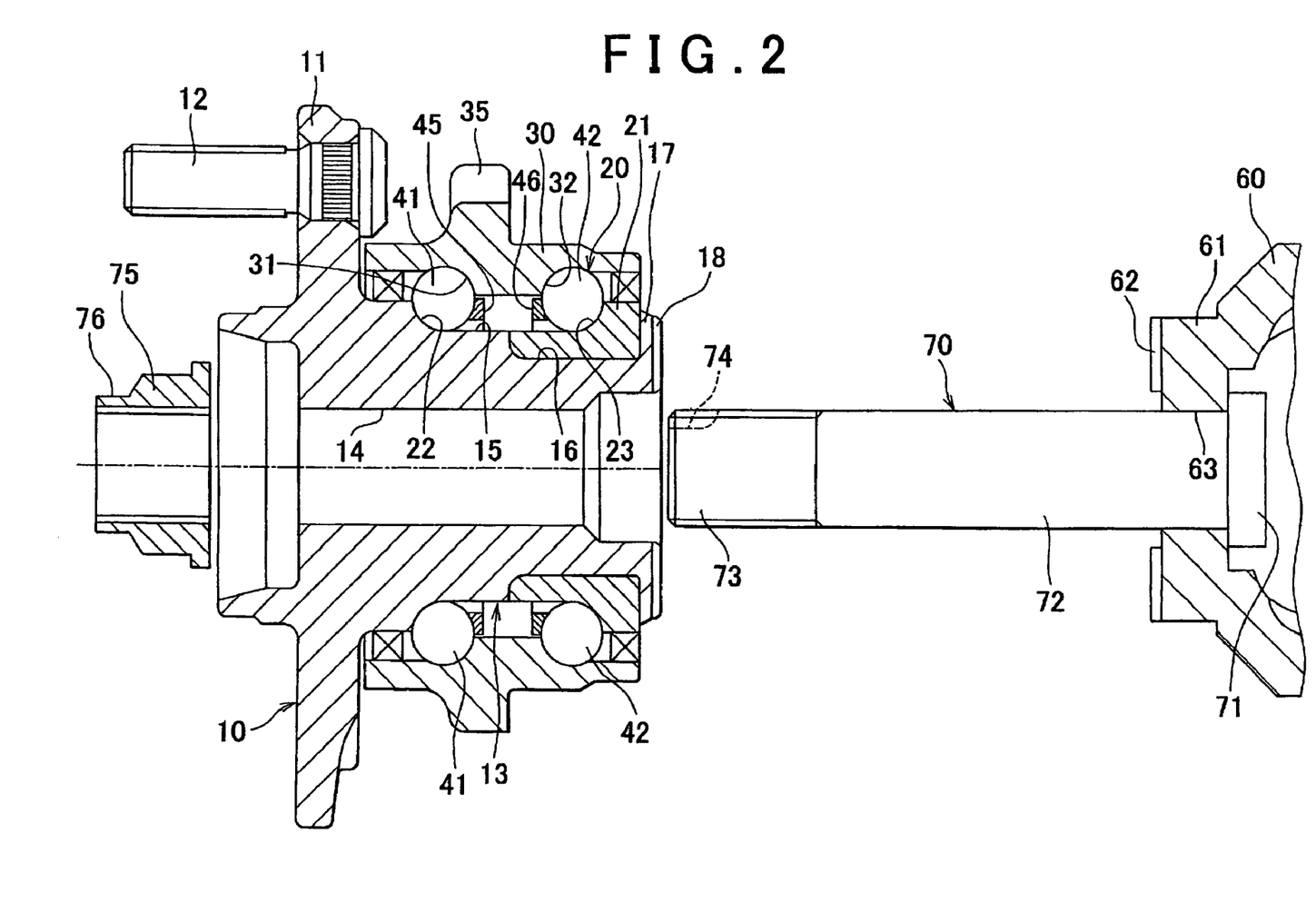
FIG. 2 is an illustrative diagram of the first embodiment which shows a state in which a wheel hub and a constant-velocity joint are separated from each other.

A first embodiment of this invention will be described with reference to FIG. 1 and FIG. 2. FIG. 1 is a longitudinal sectional view showing a wheel bearing assembly 1 in accordance with the first embodiment of this invention. FIG. 2 is an illustrative diagram of the first embodiment, showing a state in which a wheel hub and a constant-velocity joint are separated from each other. As shown in FIG. 1, the wheel bearing assembly 1 in accordance with the first embodiment includes a wheel hub 10, a multi-row angular ball bearing 20 as a rolling bearing, and a constant-velocity joint 50. Incidentally, the left side in FIG. 1 and FIG. 2 corresponds to the outer side in the vehicle width direction, and the right side corresponds to the inner side in the vehicle width direction. Therefore, in the description below, the left side is termed the outer side, and the right side is termed the inner side.

The constant-velocity joint 50 used herein is a known constant-velocity joint called the Pzeppa type, or the Birfield type, and includes a constant-velocity joint inner ring 52 linked integrally to an end of a drive shaft 51, a constant-velocity joint outer ring 60, a plurality of balls 53 disposed between the constant-velocity joint inner ring 52 and the constant-velocity joint outer ring 60, and a cage 54 holding the balls 53. A first spline 62 is formed on an outer end surface of an end wall portion 61 of the constant-velocity joint outer ring 60. Besides, a penetration hole 63 through which a shaft portion 72 of a link bolt 70 provided for integrally linking the wheel hub 10 and the constant-velocity joint 50 is fitted penetrates a central portion of the end wall portion 61 of the constant-velocity joint outer ring 60.

The link bolt 70 has a head portion 71 as well as the shaft portion 72. An external threaded portion 73 is formed on a distal end portion of the shaft portion 72. Furthermore, a calk groove 74 for stopping the lock nut 75 from rotating is formed in the external threaded portion 73. As shown in FIG. 2, the shaft portion 72 of the link bolt 70 is pressingly fitted into the penetration hole 63 from the inner side of the end wall portion 61 of the constant-velocity joint outer ring 60, up to a position such that an outer end surface of the head portion 71 (the outer end surface of the head portion 71 can also be termed the lower surface of the head portion 71 if the head portion of the bolt is described as a top portion of the bolt). The link bolt is fixed at that position. As a result of this, the shaft portion 72 of the link bolt 70 protrudes a predetermined length from the outer end surface of the end wall portion 61 of the constant-velocity joint outer ring 60. Incidentally, it is desirable that serration be formed on a portion of the shaft portion 72 adjacent to the head portion 71 of the link bolt 70, and the serrated shaft portion be pressingly fitted into the penetration hole 63 so as to enhance the press-fit strength and prevent rotation of the shaft portion.

As shown in FIG. 1, the wheel hub 10 has a hub spindle 13, and a flange 11 that is formed at an outer end of an outer peripheral surface of the hub spindle 13. Then, a plurality of hub bolts 12 for attachment thereof to a traveling wheel (not shown), with a brake rotor (not shown) interposed therebetween, are provided at a predetermined pitch, and are press-fitted into and fixed in the flange 11. A rolling bearing outer ring 30, a rolling bearing inner ring 21, and the multi-row angular ball bearing 20 that includes a plurality of balls 41, 42 as rolling elements, and cages 45 and 46 are assembled on an outer periphery of the hub spindle 13. That is, in the first embodiment, the hub spindle 13 has a large-diameter shaft portion 15 that is formed at a flange 11 side (the outer side of the hub spindle 13 in the vehicle width direction), and a small-diameter shaft portion 16 that is appropriately smaller than the large-diameter shaft portion 15, and is formed continuously from a inner side of the large-diameter shaft portion 15 with a step portion therebetween. The large-diameter shaft portion 15 and the small-diameter shaft portion 16 are integral with each other. On an outer peripheral surface of the large-diameter shaft portion 15, an raceway surface 22 (a second inner ring raceway surface) is formed at a position that is apart from an raceway surface 31 of a rolling bearing outer ring 30 to the outer side in the axis direction, and faces the raceway surface 31. The rolling bearing inner ring 21 is fitted to an outer peripheral surface of the small-diameter shaft portion 16 of the hub spindle 13. On an outer peripheral surface of the rolling bearing inner ring 21, an raceway surface 23 (a second raceway surface or a first inner ring raceway surface) is formed at a position that is apart from another raceway surface 32 (a first raceway surface) of the rolling bearing outer ring 30 to the inner side in the axis direction, and faces the raceway surface 32. The rolling bearing inner ring 21 is fixed between the aforementioned step portion adjacent to the large-diameter shaft portion 15 and a calked portion 17 that is formed by calking a distal end of the small-diameter shaft portion 16 radially outward after the rolling bearing inner ring 21 is fitted. Besides, the balls 41 and 42 (rolling elements), and the cages 45 and 46 that hold the balls 41 and 42, respectively, are assembled between the two raceway surfaces 31 and 32 of the rolling bearing outer ring 30 and the two raceway surfaces 22 and 23 of the hub spindle 13. Besides, a fixation flange 35 for attachment via bolts to a vehicle body member (a knuckle, or a carrier) supported on a suspension device (not shown) of the vehicle is formed integrally with an outer peripheral surface of the rolling bearing outer ring 30.

As shown in FIG. 1, a second spline 18 is formed on the inner end surface of the hub spindle 13, that is, the inner end surface of the calked portion 17 of the hub spindle 13 in the first embodiment. The second spline 18 is in mesh with the first spline 62 that is formed on the end wall portion 61 of the constant-velocity joint outer ring 60 which abuts on the inner end surface of the hub spindle 13. Besides, the central hole 14 of the hub spindle 13 is formed so as to have a hole diameter that allows the shaft portion 72 of the link bolt 70 to be inserted into (fitted into) the central hole 14, with a small clearance.

In the wheel bearing assembly in accordance with the first embodiment constructed as described above, when the wheel hub 10 and the constant-velocity joint 50 are integrally linked to each other so as to be capable of torque transmission, the shaft portion 72 of the link bolt 70 is press-fitted, beforehand, into the penetration hole 63 of the end wall portion 61 from the inner side of the end wall portion 61 of the constant-velocity joint outer ring 60, up to such a position that the lower surface of the head portion 71 (the outer end surface thereof) contacts the inner surface of the end wall portion 61. As a result of this, the shaft portion 72 of the link bolt 70 protrudes a predetermined length from the outer surface of the end wall portion 61 of the constant-velocity joint outer ring 60. Next, the shaft portion 72 of the link bolt 70 is inserted through the central hole 14 of the hub spindle 13 of the wheel hub 10 from the inner side (the inner side in the vehicle width direction) toward the outer side (the outer side in the vehicle width direction). At this time, the external threaded portion 73 provided at the distal end portion of the shaft portion 72 of the link bolt 70 is protruded from the central hole 14 of the hub spindle 13 to the outer side, while the second spline 18 provided on the inner end surface of the hub spindle 13 and the first spline 62 provided on the outer end surface of the end wall portion 61 of the constant-velocity joint outer ring 60 are being brought into mesh. Then, a lock nut 75 is fastened to the external threaded portion 73 of the shaft portion 72 of the link bolt 70, to a required fastened state. Finally, a portion of a thin-walled portion 76 provided at an end portion of the lock nut 75 is calked into the calk groove 74 of the external threaded portion 73, so that the wheel hub 10 and the constant-velocity joint 50 are linked together.

Besides, in the first embodiment, of the shaft portion 72 of the link bolt 70 and the central hole 14 of the hub spindle 13, at least the central hole 14 of the hub spindle 13 is formed and worked with high accuracy so that the shaft portion 72 of the link bolt 70 and the central hole 14 of the hub spindle 13 are fit to each other with a very small clearance therebetween. As a result, the wheel hub 10 and the constant-velocity joint 50 can be accurately aligned on one and the same center line through the operation of inserting the shaft portion 72 of the link bolt 70 through the central hole 14 of the hub spindle 13.

Besides, in this first embodiment, the distal end of the small-diameter shaft portion 16 of the hub spindle 13 is calked radially outward, and the second spline 18 is formed on the inner end surface of the calked portion 17 formed in that manner. Therefore, in comparison with the case where the calked portion 17 is not formed, the outside diameter dimension of the second spline 18 cannot be made larger. Then, the first spline 62 having the same outside diameter dimension as the second spline 18 of the hub spindle 13 is formed on an external surface of the end wall portion 61 of the constant-velocity joint outer ring 60, and is meshed with the second spline 18, so that the torque transmission characteristic can be improved.

Second Embodiment

Figure 3:
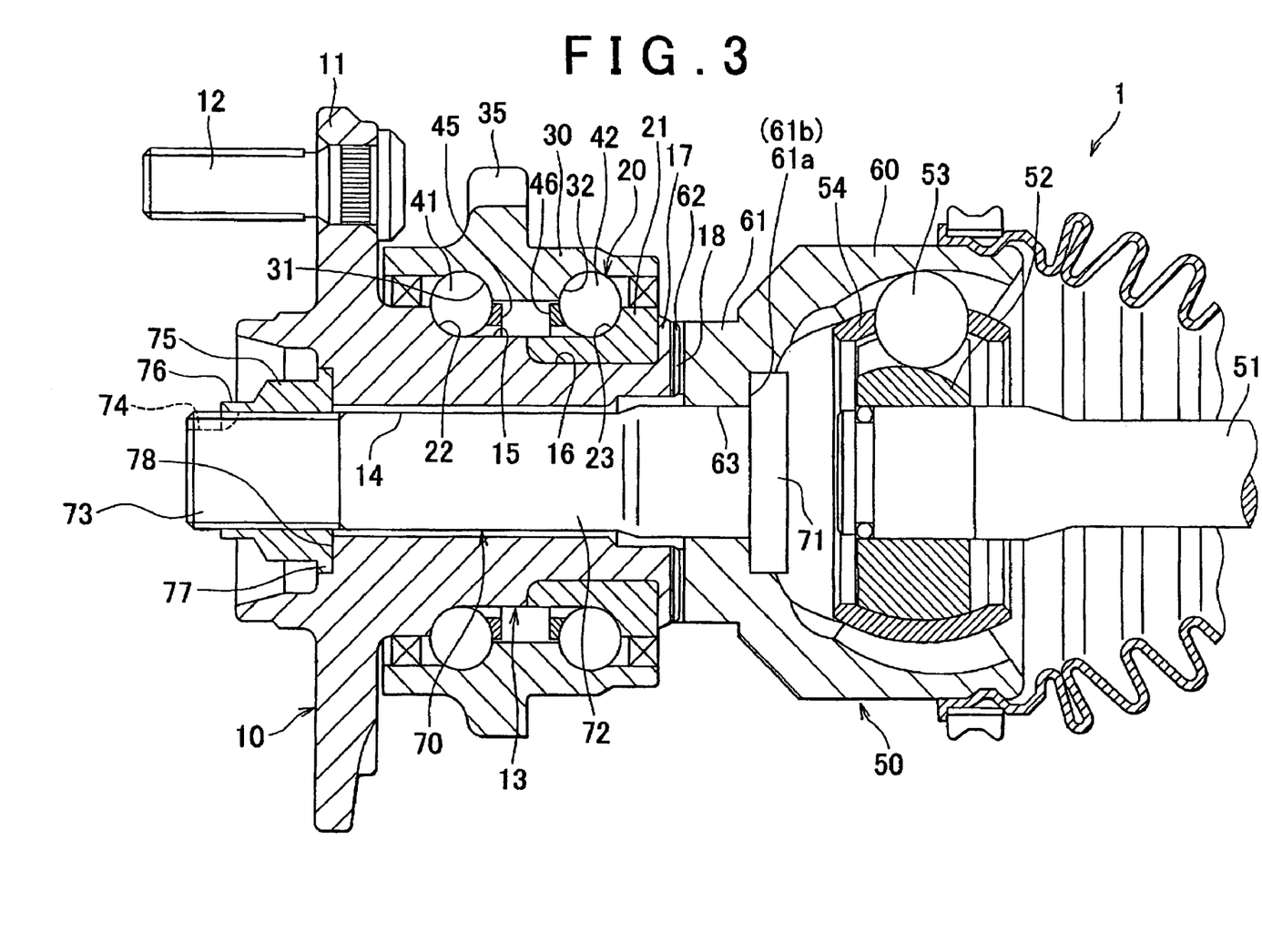
FIG. 3 is a longitudinal sectional view showing a wheel bearing assembly in accordance with a second embodiment of the invention.
Figure 4:
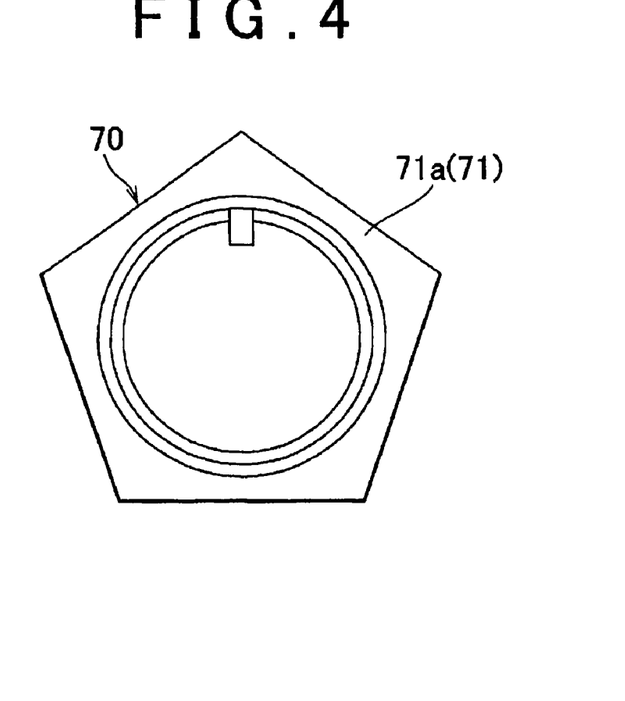
FIG. 4 is an illustrative diagram showing an example of the second embodiment in which a head portion of a link bolt has a polygonal shape.
Figure 5:
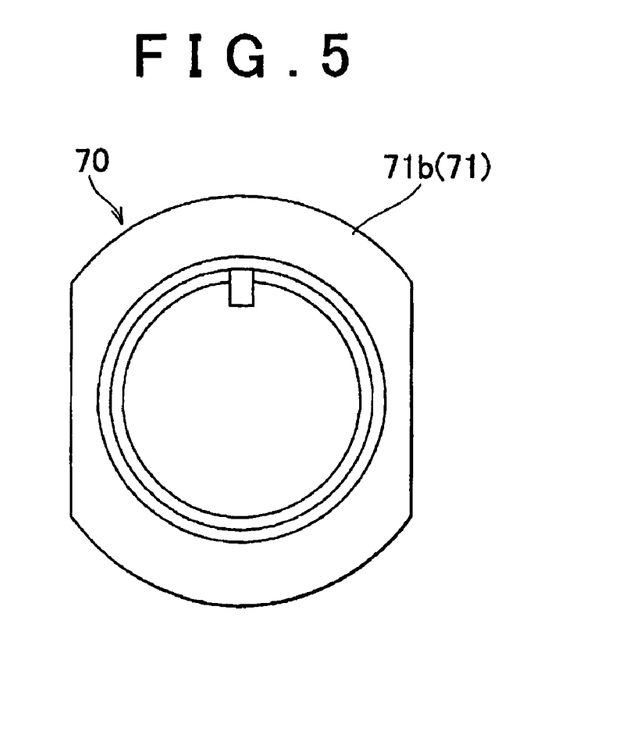
FIG. 5 is an illustrative diagram showing a modification of the second embodiment in which flat surfaces are formed on a peripheral edge of a head portion of the link bolt.

Next, a second embodiment of this invention will be described with reference to FIG. 3 to FIG. 5. FIG. 3 is a longitudinal sectional view showing a wheel bearing assembly 1 in accordance with the second embodiment of the invention. FIG. 4 is an illustrative diagram showing an example of the second embodiment in which the head portion of a link bolt has a polygonal shape. FIG. 5 is an illustrative diagram showing a modification of the second embodiment in which flat surfaces are formed on a periphery of the head portion of the link bolt.

As shown in FIG. 3, in the second embodiment, a second recess portion 78 for center alignment that has an inside diameter dimension that is substantially equal to the diameter dimension of a circular jaw portion (circular seat portion) 77 of the lock nut 75 is formed on the outer end surface of the hub spindle 13 of the wheel hub 10, surrounding the central hole 14. Besides, in this second embodiment, the head portion 71 of the link bolt 70 has a noncircular shape. For example, as shown in FIG. 4, a head portion 71a of the link bolt 70 has a polygonal shape (a regular pentagon shape in FIG. 4), that is, a plurality of flat surfaces are formed on a peripheral side surface of the head portion 71a, or as shown in FIG. 5, two flat surfaces are formed on a peripheral side surface of a circular head portion 71b of the link bolt 70. A first recess portion 61a (or 61b) having a shape that is the same as the shape of the head portion 71a (or 71b) of the link bolt 70 so as to fit to the head portion 71a (or 71b) and prevent it from rotating is formed around the penetration hole 63, on the inner surface of the end wall portion 61 of the constant-velocity joint outer ring 60. Other constructions of the second embodiment are substantially the same as those of the first embodiment, and the same component portions are denoted by the same reference characters, and the descriptions thereof are omitted below.

Therefore, this second embodiment advantageously achieves the capability of facilitating the linking of the wheel hub 10 and the constant-velocity joint 50, and the capability of allowing the outside diameter dimension of the second spline 18 to be increased, similarly to the first embodiment. In particular, in this second embodiment, by fitting the circular jaw portion 77 of the lock nut 75 into the center-aligning second recess portion 78 around the central hole 14 on the outer end surface of the hub spindle 13, and fastening the lock nut 75 to the external threaded portion 73 of the shaft portion 72 of the link bolt 70, the wheel hub 10 and the constant-velocity joint 50 can be accurately aligned on the same center line. Besides, since the central hole 14 of the hub spindle 13 does not need to be highly accurately bored, the second embodiment is effective in reducing the processing cost.

Besides, in this second embodiment, since the head portion 71a (or 71b) of the link bolt 70 is fit into the first recess portion 61a (or 61b) of the end wall portion 61 of the constant-velocity joint outer ring 60 so as to be prevented from rotating, the link bolt 70 does not accidentally rotate when the lock nut 75 is fastened to the external threaded portion 73 of the shaft portion 72 of the link bolt 70. Thus, the lock nut 75 can easily be fastened.

Figure 6:
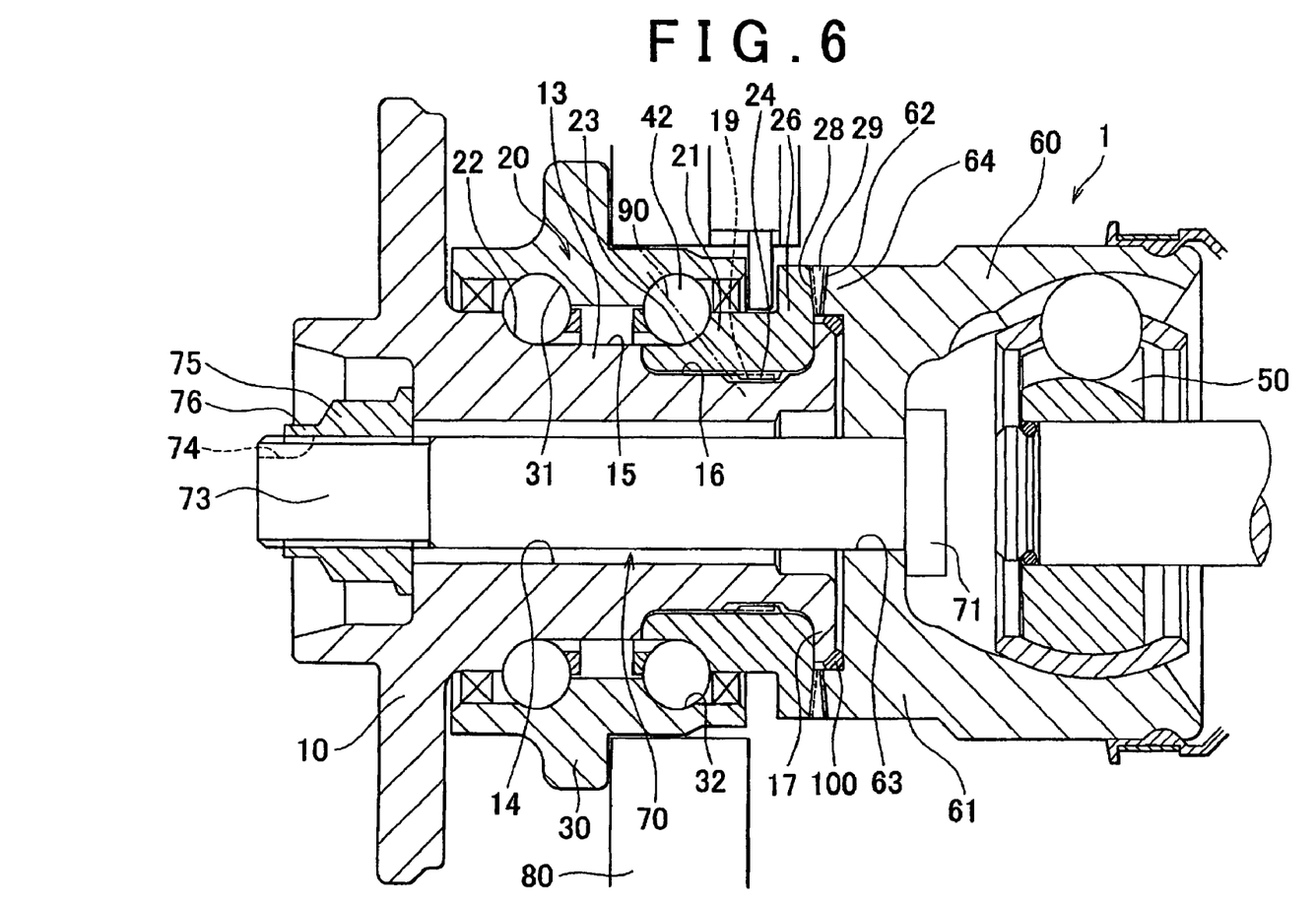
FIG. 6 is a sectional view of a wheel bearing assembly in a third embodiment of the invention which is taken on a plane parallel to an axis.

FIG. 6 shows a sectional view of a wheel bearing assembly 1 in a third embodiment of the invention which is taken on a plane parallel to the axis. In the wheel bearing assembly 1, a rolling bearing inner ring 21 of the multi-row ball bearing 20, that is, an angular contact rolling bearing, is fitted to an outer periphery of the small-diameter shaft portion 16 of the hub spindle 13 of the wheel hub 10. On an outer peripheral surface of a large-diameter shaft portion 15, an raceway surface 22 (a second inner ring raceway surface) is formed at a position that is apart from an raceway surface 31 of a rolling bearing outer ring 30 to the outer side in the axis direction. The multi-row ball bearing 20 has an raceway surface 23 (a second raceway surface or a first inner ring raceway surface) that is formed on the rolling bearing inner ring 21. The raceway surface 23 is formed at a position apart from the raceway surface 32 of the rolling bearing outer ring 30 to the inner side in the axis direction so as to face the raceway surface 32 (a first raceway surface). Besides, the multi-row ball bearing 20 has a rolling bearing outer ring 30 that is attached to a knuckle 80 of a vehicle body. An inner peripheral surface of the rolling bearing inner ring 21 is provided with a third spline 24, and an outer peripheral surface of the hub spindle 13 is provided with a fourth spline 19. Due to the mutual meshing of the third spline 24 and the fourth spline 19, the relative rotation of the hub spindle 13 and the rolling bearing inner ring 21 is prevented. Balls 42 (rolling elements) are sandwiched between the raceway surface 23 of the rolling bearing inner ring 21 of the multi-row ball bearing 20 and the raceway surface 32 of the rolling bearing outer ring 30. Besides, the multi-row ball bearing 20 is an angular contact rolling bearing in which two rows of balls are set apart from each other in the direction of the axis of the hub spindle 13, and a straight line 90 passing through a contact point between the raceway surface 23 and a ball 42 and a contact point between the raceway surface 32 and the ball 42 is inclined so as to have a predetermined angle to a straight line extending in the axis direction of the hub spindle 13. A meshing area of the fourth spline 19 of the outer peripheral surface of the hub spindle 13 and the third spline 24 of the inner peripheral surface of the rolling bearing inner ring 21 is formed at a position that is apart to the inner side in the axis direction from the straight line 90 connecting the contact point between the raceway surface 23 of the multi-row ball bearing 20 and each ball 42 and the contact point between the raceway surface 32 and the ball 42. The hub spindle 13 and the rolling bearing inner ring 21 are substantially prevented from loosening in the direction of the axis, by a calked portion 17 that is formed by calking an inner end of the hub spindle 13 to an inner end surface 28 of the rolling bearing inner ring 21. Incidentally, this calked portion 17 is formed by radially expanding the inner end of the cylinder-shape hub spindle 13 through a press process, and pressing the expanded portion against the inner end surface 28 of the rolling bearing inner ring 21.

Besides, a flange portion 26 is formed on a inner end of the rolling bearing inner ring 21 of the multi-row ball bearing 20. The flange portion 26 extends radially outward from the calked portion 17 that is formed by calking the inner end of the hub spindle 13. A second spline 29 is formed at a site on the inner end surface 28 of the flange portion 26 which is positioned radially outward from the calked portion 17 that is formed by calking the inner end of the hub spindle 13. Besides, on an outer end surface 64 of an end wall portion 61 of the constant-velocity joint outer ring 60, there is formed a first spline 62 that meshes with the second spline 29 formed on the inner end surface 28 of the rolling bearing inner ring 21.

The link bolt 70 is inserted through a penetration hole 63 formed in an outer-side central portion of the constant-velocity joint outer ring 60, and the central hole 14 formed in a central portion of the wheel hub 10, from the vehicle inner side of the constant-velocity joint outer ring 60. An external threaded portion 73 formed on a distal end of the link bolt 70 is protruded from the outer end surface of the hub spindle 13, and a lock nut 75 is screwed to the external threaded portion 73. Therefore, the hub spindle 13 of the wheel hub 10 and the constant-velocity joint outer ring 60 are fastened and fixed to each other by the axial tension. Further, the second spline 29 provided on the inner end surface 28 of the rolling bearing inner ring 21 fitted over the hub spindle 13, and the first spline 62 provided on the outer end surface 64 of the constant-velocity joint outer ring 60 are meshed with each other. Incidentally, an O-ring 100 for the fixing and sealing purpose is mounted between the calked portion 17 of the hub spindle 13 and the outer end surface 64 of the constant-velocity joint outer ring 60.

Figure 7:
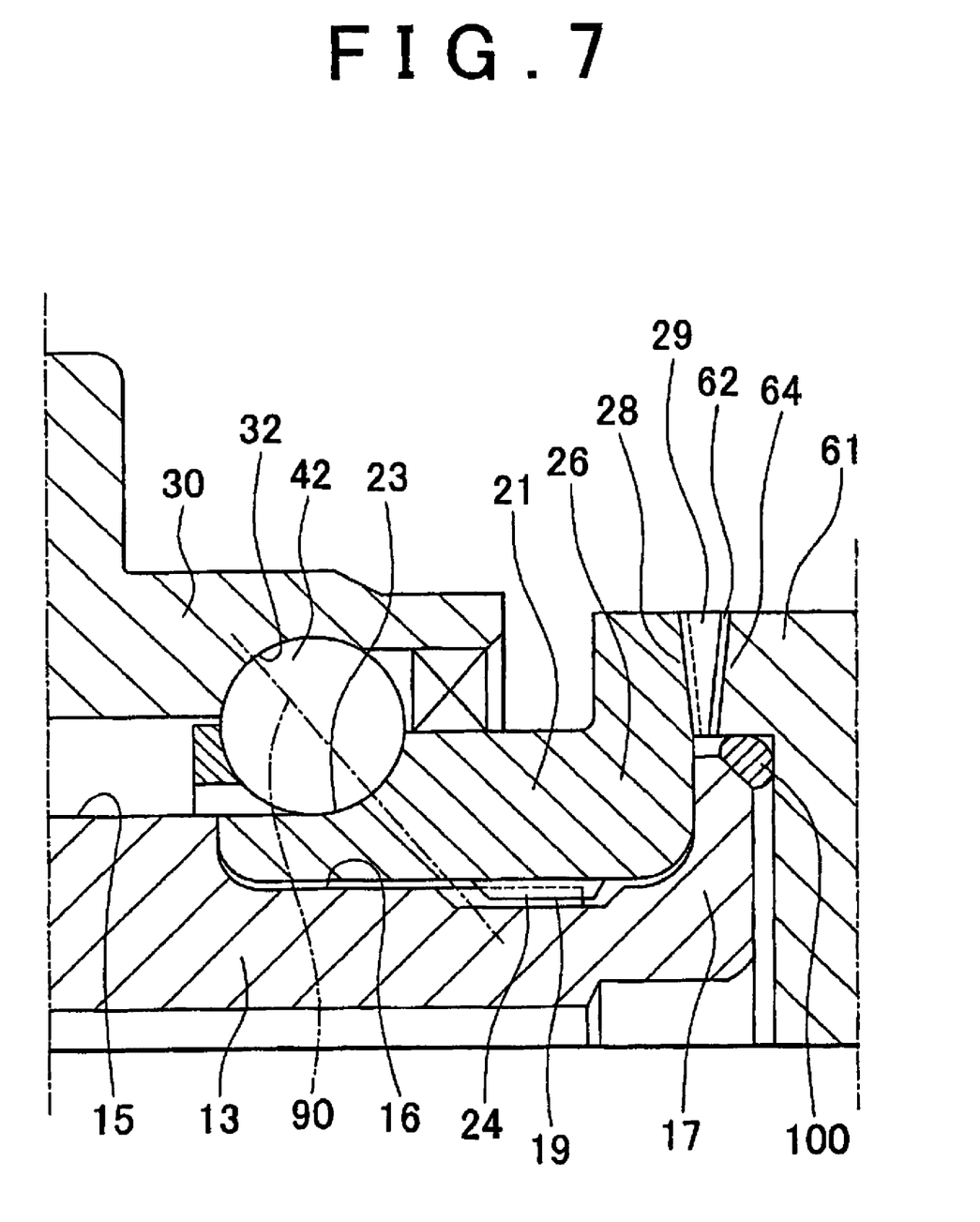
FIG. 7 is an enlarged sectional view of the third embodiment, showing spline-meshed portions.

The third embodiment advantageously achieves the capability of facilitating the linking of the wheel hub 10 and the constant-velocity joint 50, similarly to the first embodiment. In particular, according to the third embodiment, the torque of the constant-velocity joint 50 is transmitted to the rolling bearing inner ring 21 by the engagement between the first spline 62 of the outer end surface 64 of the constant-velocity joint outer ring 60 and the second spline 29 of the inner end surface 28 of the roiling bearing inner ring 21 of the multi-row ball bearing 20. Then, the torque transmitted to the rolling bearing inner ring 21 is transmitted to the hub spindle 13 by the meshing portions of the third spline 24 formed on the inner peripheral surface of the rolling bearing inner ring 21 and the fourth spline 19 formed on the outer peripheral surface of the hub spindle 13 of the wheel hub 10. It is to be noted herein that the site where the second spline 29 of the inner end surface 28 of the rolling bearing inner ring 21 is formed does not need to be plastically deformed, unlike the calked portion 17, and has a strength required of the rolling bearing inner ring 21 of the rolling bearing. Therefore, after the second spline 29 is formed, the entire rolling bearing inner ring 21 is subjected to heat treatment so as to enhance the strength of tooth surfaces of the second spline 29 before assembly of the wheel bearing assembly 1. Hence, the strength of the site where the second spline 29 is formed is high, and torque can be transmitted in a good manner. Therefore, the wheel bearing assembly 1 is advantageous against the shear stress caused by the running torque.

Besides, the flange portion 26 provided on the inner end in the rolling bearing inner ring 21 is formed extending radially outward. The inner end surface 28 of the rolling bearing inner ring 21 and the outer end surface 64 of the constant-velocity joint outer ring 60 are engaged with each other by the meshing of the second spline 29 and the first spline 62, at a position that is outward in a radial direction of the rolling bearing inner ring 21 from the position at which the calked portion 17 of the inner end of the hub spindle 13 is fixed by calking. Hence, the diameter of the first spline 62 and the second spline 29 is made larger, so that the torque transmission capability improves, and advantage against shear stress is achieved.

Besides, according to the third embodiment, the spline meshing area between the inner peripheral surface of the rolling bearing inner ring 21 and the outer peripheral surface of the hub spindle 13 of the wheel hub 10 is formed at a position that is apart to the inner side in the axis direction from the straight line 90 that connects the contact point between the raceway surface 23 of the multi-row ball bearing 20 and a ball 42 and the contact point between the raceway surface 32 and the ball 42. Therefore, the load during the rolling of the balls 42 of the multi-row ball bearing 20 does not act on the spline meshing area between the inner peripheral surface of the rolling bearing inner ring 21 and the outer peripheral surface of the hub spindle 13 of the wheel hub 10, and therefore the movement of the balls 42 of the multi-row ball bearing 20 becomes stable. Furthermore, since the inner end of the hub spindle 13 is fixed by calking to the inner end surface 28 of the rolling bearing inner ring 21 of the multi-row ball bearing 20, the loosening between the hub spindle 13 and the rolling bearing inner ring 21 in the axis direction is restrained, and the raceway surface 23 of the rolling bearing inner ring 21 in the multi-row ball bearing 20 becomes stable.

In the foregoing third embodiment, the hub spindle 13 of the wheel hub 10 and the constant-velocity joint outer ring 60 are interlinked via the link bolt 70 and the lock nut 75 so as to be capable of transmitting torque therebetween. However, it is also permissible to adopt a construction in which a central shaft portion is integrally formed with the constant-velocity joint outer ring 60, and the central shaft portion is inserted through and spline-meshed to the central hole 14 of the hub spindle 13, and a distal end of the central shaft portion protruded outward from the hub spindle 13 is fixed by calking to a periphery of the central hole 14 of the hub spindle 13.

Besides, although in the third embodiment, the inner end of the hub spindle 13 is fixed by calking to the inner end surface 28 of the rolling bearing inner ring 21 of the multi-row ball bearing 20, it is also permissible to adopt a construction in which the inner end of the hub spindle 13 is not fixed by calking, but is caused to be in firm contact with the outer end surface 64 of the constant-velocity joint outer ring 60. In the case where the inner end of the hub spindle 13 is not fixed by calking, it is also permissible to form face splines 29 over the entire area of the inner end surface 28 of the flange portion 26 formed on the inner end in the rolling bearing inner ring 21. In this case, it is also permissible to adopt a construction in which the flange portion 26 of the rolling bearing inner ring 21 does not extend radially outward.

Figure 8:
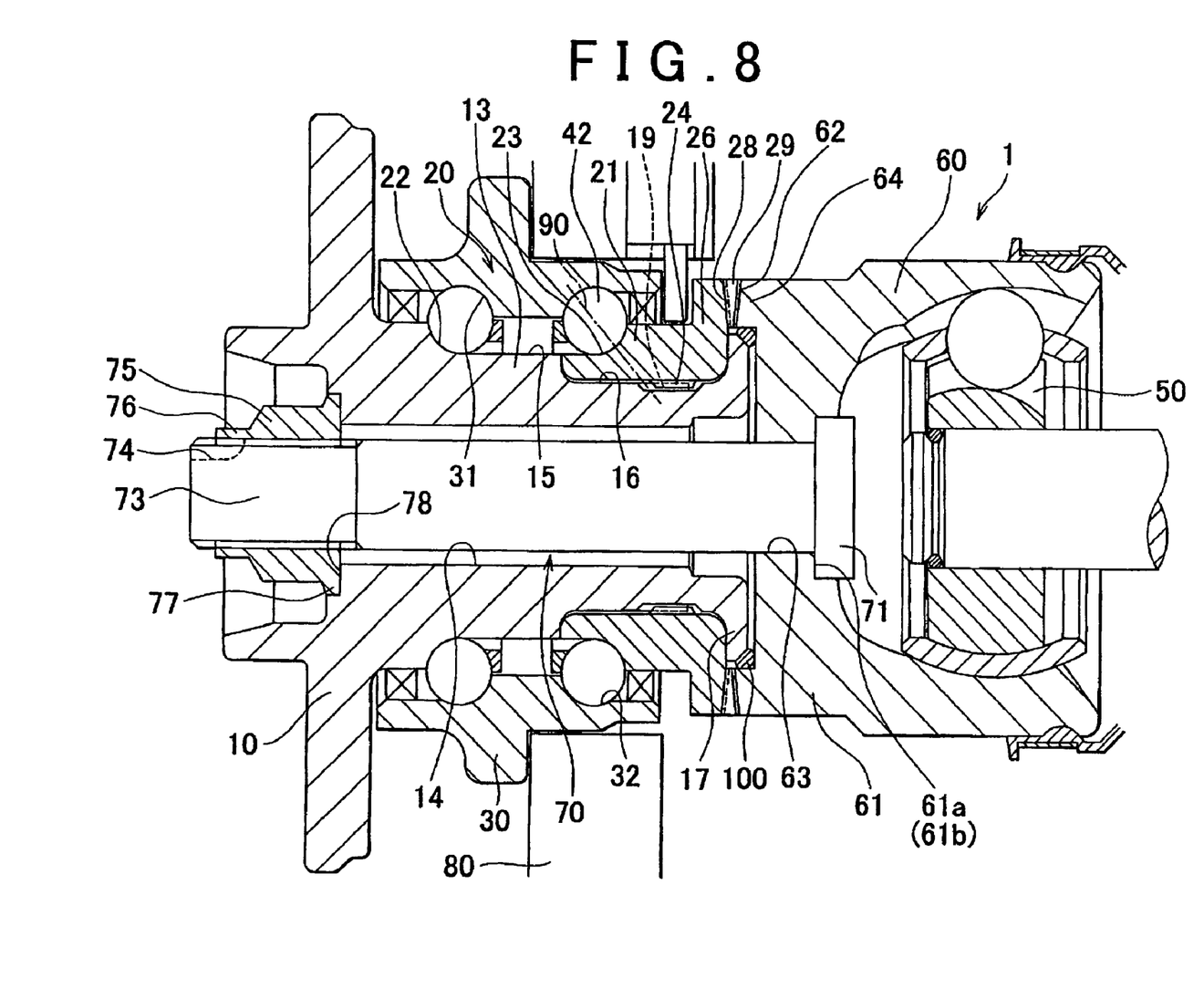
FIG. 8 is a sectional view of a wheel bearing assembly in a fourth embodiment of the invention which is taken on a plane parallel to an axis.

Next, a fourth embodiment of the invention will be described with reference to FIG. 8. FIG. 8 shows a sectional view of a wheel bearing assembly 1 in the fourth embodiment of the invention which is taken on a plane parallel to the axis.

As shown in FIG. 8, in the fourth embodiment, the fastening structure of the second embodiment is applied as well as constructions of the third embodiment. Concretely, on an outer end surface of a hub spindle 13 of a wheel hub 10, a second recess portion 78 for center alignment is formed around a central hole 14. An inside diameter dimension of the second recess portion 78 is substantially equal to the diameter of a circular jaw portion (circular seat portion) 77 of a lock nut 75. Besides, in the fourth embodiment, too, a head portion 71 of a link bolt 70 has a noncircular shape. For example, as in the second embodiment, as shown in FIG. 4, a head portion 71a of the link bolt 70 has a polygonal shape (a regular pentagon shape in FIG. 4), that is, a plurality of flat surfaces are formed on a peripheral side surface of the head portion 71a, or as shown in FIG. 5, two flat surfaces are formed on a peripheral side surface of a circular head portion 71b of the link bolt 70. A first recess portion 61a (or 61b) having a shape that is the same as the shape of the head portion 71a (or 71b) of the link bolt 70 so as to fit to the head portion 71a (or 71b) and prevent it from rotating is formed around a penetration hole 63, on the inner surface of the end wall portion 61 of the constant-velocity joint outer ring 60. Other constructions of the fourth embodiment are substantially the same as those of the third embodiment, and the same component portions are denoted by the same reference characters, and the descriptions thereof are omitted below.

Hence, the fourth embodiment advantageously achieves the capability of facilitating the linking of the wheel hub 10 and the constant-velocity joint 50, similarly to the first embodiment, and also achieves the effect of becoming advantageous against shear stress, and the effect of making the raceway surface 24 of the rolling bearing inner ring 22 stable. Besides, in this fourth embodiment, the wheel hub 10 and the constant-velocity joint 50 can be accurately aligned on one and the same center line, similarly to the second embodiment. Besides, since the central hole 14 of the hub spindle 13 does not need to be highly accurately bored, the fourth embodiment is effective in reducing the processing cost.

Besides, in this fourth embodiment, since the head portion 71a (or 71b) of the link bolt 70 is fit into the first recess portion

61a (or 61b) of the end wall portion 61 of the constant-velocity joint outer ring 60 so as to be prevented from rotating, the link bolt 70 does not accidentally rotate when the lock nut 75 is fastened to the external threaded portion 73 of the shaft portion 72 of the link bolt 70. Thus, the lock nut 75 can easily be fastened.

Although the first to fourth embodiments each employ the multi-row angular ball bearing 20 as an angular contact rolling bearing, the angular contact rolling bearing is not limited to the multi-row ball bearings, but can also be a multi-row conical rolling bearing, and may also be a single-row rolling bearing. The invention can be carried out in various forms within the scope of the spirit of the invention.

What is claimed is:

1. A wheel bearing assembly comprising:
   a wheel hub having a hub spindle, and a central hole that penetrates the hub spindle;
   a rolling bearing provided on an outer periphery of the hub spindle of the wheel hub;
   a constant-velocity joint outer ring having an end wall portion, a penetration hole that penetrates the end wall portion, and a first spline provided on an outer end surface of the end wall portion;
   a link bolt that has a shaft portion, a head portion provided on an inner end of the shaft portion, and an external threaded portion provided on an outer end of the shaft portion, and that links the wheel hub and the constant-velocity joint outer ring; and
   a lock nut that is screwed to the external threaded portion of the link bolt,
   wherein a second spline is provided on at least one of an inner end surface of the hub spindle and an inner end surface of the rolling bearing, and
   wherein an outer surface of the head portion of the link bolt contacts an inner surface of the end wall portion of the constant-velocity joint outer ring, and the shaft portion of the link bolt is press-fitted into the penetration hole of the constant-velocity joint outer ring, and
   the external threaded portion of the link bolt is inserted through the central hole of the hub spindle, and the lock nut is fastened to the external threaded portion protruded from an outer end surface of the hub spindle,
   so that the wheel hub and the constant-velocity joint outer ring are linked with each other, and the first spline and the second spline are meshed with each other so as to be capable of torque transmission.

2. The wheel bearing assembly according to claim 1, wherein:
   the rolling bearing includes a rolling bearing inner ring;
   a calked portion that is calked radially outward, and fixes the rolling bearing inner ring is formed on the inner end of the hub spindle of the wheel hub; and
   the second spline is formed on an inner end surface of the calked portion.

3. The wheel bearing assembly according to claim 1, wherein:
   the head portion of the link bolt is non-circular; and
   a first recess portion that is fitted to the head portion of the link bolt so as to prevent the head portion from rotating is formed on the inner surface of the end wall portion of the constant-velocity joint outer ring.

4. The wheel bearing assembly according to claim 3, wherein
   a flat surface is formed on a periphery of the head portion of the link bolt, and the first recess portion has a shape that corresponds to a shape of the head portion, so that the link bolt is prevented from rotating.

5. The wheel bearing assembly according to claim 1, wherein:
   a circular jaw portion is formed on a seat portion of the lock nut; and
   a second recess portion for center alignment that has an inside diameter dimension substantially equal to a diameter dimension of the circular jaw portion of the lock nut is formed on an outer end surface of the hub spindle of the wheel hub.

6. The wheel bearing assembly according to claim 1, wherein
   the second spline is provided on an inner end surface of the rolling bearing.

7. The wheel bearing assembly according to claim 6, wherein
   the rolling bearing has a rolling bearing inner ring whose inner end surface is provided with the second spline, and which has been treated with heat.

8. The wheel bearing assembly according to claim 6, wherein:
   the rolling bearing is an angular contact rolling bearing;
   the angular contact rolling bearing includes a rolling bearing outer ring, a rolling bearing inner ring, a first raceway surface provided on the rolling bearing outer ring, a second raceway surface that is provided on the rolling bearing inner ring and that is disposed apart in an axis direction of the hub spindle from the first raceway surface, and a rolling element that is provided between the first raceway surface and the second raceway surface and that contacts the first raceway surface and the second raceway surface; and
   a spline meshing area at which a third spline provided on an inner peripheral surface of the rolling bearing inner ring and a fourth spline provided on an outer peripheral surface of the hub spindle mesh with each other is provided at a position that is apart from a straight line that connects a contact point between the rolling element and the first raceway surface, and a contact point between the rolling element and the second raceway surface.

9. The wheel bearing assembly according to claim 8, wherein
   the spline meshing area is disposed apart from the straight line to an inner side in the axis direction of the hub spindle.

10. The wheel bearing assembly according to claim 6, wherein:
    the rolling bearing has a rolling bearing inner ring; and
    a calked portion is formed by calking an inner end of the hub spindle radially outward, and the rolling bearing inner ring is fixed by the calked portion.

11. The wheel bearing assembly according to claim 10, wherein:
    the rolling bearing has a rolling bearing inner ring, and a flange portion that extends from an inner end of the rolling bearing inner ring in a radially outward direction;
    the calked portion is formed by calking the inner end surface of the hub spindle radially outward, at a site that is positioned radially inward in the flange portion; and
    the second spline is formed at a site on the flange portion that is positioned radially outward from the calked portion of the hub spindle.

12. The wheel bearing assembly according to claim 6, wherein:
    the rolling bearing has a rolling bearing inner ring, and a flange portion that extends from an inner end of the rolling bearing inner ring in a radially outward direction; and the second spline is provided at a radially outward position on the flange portion.

13. The wheel bearing assembly according to claim 1, wherein:
the rolling bearing is a multi-row rolling bearing having a rolling bearing inner ring; and
a first inner ring raceway surface is formed on the rolling bearing inner ring, and a second inner ring raceway surface is formed on an outer peripheral surface of the hub spindle.

14. The wheel bearing assembly according to claim 1, wherein:
the rolling bearing has a rolling bearing outer ring, a rolling bearing inner ring, a rolling element positioned between the rolling bearing outer ring and the rolling bearing inner ring, and a cage that holds the rolling element;
the hub spindle has a large-diameter shaft portion, and a small-diameter shaft portion that is smaller in diameter than the large-diameter shaft portion; and
the rolling bearing inner ring is fitted to the small-diameter shaft portion of the hub spindle.

15. A method of manufacturing a wheel bearing assembly, comprising:
preparing a wheel hub having a hub spindle, and a central hole that penetrates the hub spindle;
preparing a rolling bearing disposed on an outer periphery of the hub spindle of the wheel hub;
preparing a constant-velocity joint outer ring having an end wall portion, a penetration hole that penetrates the end wall portion, and a first spline provided on an outer end surface of the end wall portion; and
preparing a link bolt that has a shaft portion, a head portion provided on an inner end of the shaft portion, and an external threaded portion provided on the outer end of the shaft portion, and that links the wheel hub and the constant-velocity joint outer ring;
preparing a lock nut that is screwed to the external threaded portion of the link bolt;
using the outer ring member or the rolling bearing that has a construction in which a second spline is provided on at least one of an inner end surface of the hub spindle and an inner end surface of the rolling bearing;
press-fitting the shaft portion of the link bolt into the penetration hole of the constant-velocity joint outer ring;
causing an outer surface of the head portion of the link bolt to contact an inner surface of the end wall portion of the constant-velocity joint outer ring;
inserting the external threaded portion of the link bolt through the central hole of the hub spindle, and causing the external threaded portion to protrude from the outer end surface of the hub spindle; and
linking the wheel hub and the constant-velocity joint outer ring by fastening the lock nut to the external threaded portion.

16. The manufacturing method according to claim 15, further comprising:
forming the second spline on the inner end surface of the rolling bearing inner ring of the rolling bearing; and
treating the rolling bearing inner ring with heat.

* * * * *